(12) United States Patent
Tierney et al.

(10) Patent No.: US 8,910,193 B2
(45) Date of Patent: Dec. 9, 2014

(54) DYNAMICALLY BINDING DATA IN AN APPLICATION

(75) Inventors: James Tierney, Santa Cruz, CA (US); John Ray Thomas, Aptos, CA (US)

(73) Assignee: Embarcadero Technologies, Inc., San Francisco, CA (US)

( * ) Notice: Subject to any disclaimer, the term of this patent is extended or adjusted under 35 U.S.C. 154(b) by 168 days.

(21) Appl. No.: 13/600,107

(22) Filed: Aug. 30, 2012

(65) Prior Publication Data

US 2013/0055296 A1    Feb. 28, 2013

Related U.S. Application Data

(60) Provisional application No. 61/529,178, filed on Aug. 30, 2011, provisional application No. 61/529,192, filed on Aug. 30, 2011.

(51) Int. Cl.
```
G06F 3/00       (2006.01)
G06F 9/445      (2006.01)
G06F 9/54       (2006.01)
```
(52) U.S. Cl.
CPC G06F 8/54 (2013.01); G06F 9/547 (2013.01); G06F 9/54 (2013.01)
USPC .......................................... 719/328; 719/330

(58) Field of Classification Search
CPC .................................. G06F 9/54; G06F 9/547
See application file for complete search history.

(56) References Cited

PUBLICATIONS

Anton Michlmayr, Towards Recovering the Broken SOA Triangle—A Software Engineering Perspective, Sep. 3, 2007.*

* cited by examiner

*Primary Examiner* — Lechi Truong

(57) ABSTRACT

A method for binding data in an application. An expression is created via a framework based on input from a developer. The expression is received at an expression engine wherein the expression describes a relation between a first property of a first data of the application to a first property of a second data of the application. A binding is created between the first data and the second data based on the relation via the expression engine. The first property of the second data is changed based on a change to the first property of the first data wherein the changing occurs because of the binding. The receiving the expression, the creating the binding, and the changing the first property are orchestrated via the framework to manage when the expression is executed in the application.

19 Claims, 4 Drawing Sheets

DYNAMICALLY BINDING DATA IN AN APPLICATION

RELATED APPLICATION

This application claims priority to and benefit of the U.S. Provisional Patent Application 61/529,178, entitled "LIVE BINDINGS" with the filing date of Aug. 30, 2011, by John Thomas et al., assigned to the assignee of the present application, and which is herein incorporated by reference in its entirety.

This application additionally claims priority to and benefit of the U.S. Provisional Patent Application 61/529,192, entitled "RUN TIME TYPE INFORMATION" with the filing date of Aug. 30, 2011, by John Thomas et al., assigned to the assignee of the present application, and which is herein incorporated by reference in its entirety.

FIELD OF THE TECHNOLOGY

The present technology relates generally to dynamically binding data in an application.

BACKGROUND

A variety of modern electronic devices have the ability to execute software applications. Software applications may be designed for a variety of functions or purposes but most, if not all software applications, require the manipulation of data. Data manipulation may require a developer to write a great deal of code in an application to direct and control the manipulation of data. Such code generation is time consuming and takes the developer's focus off of the actual function and purpose of the software application.

Figure 1:
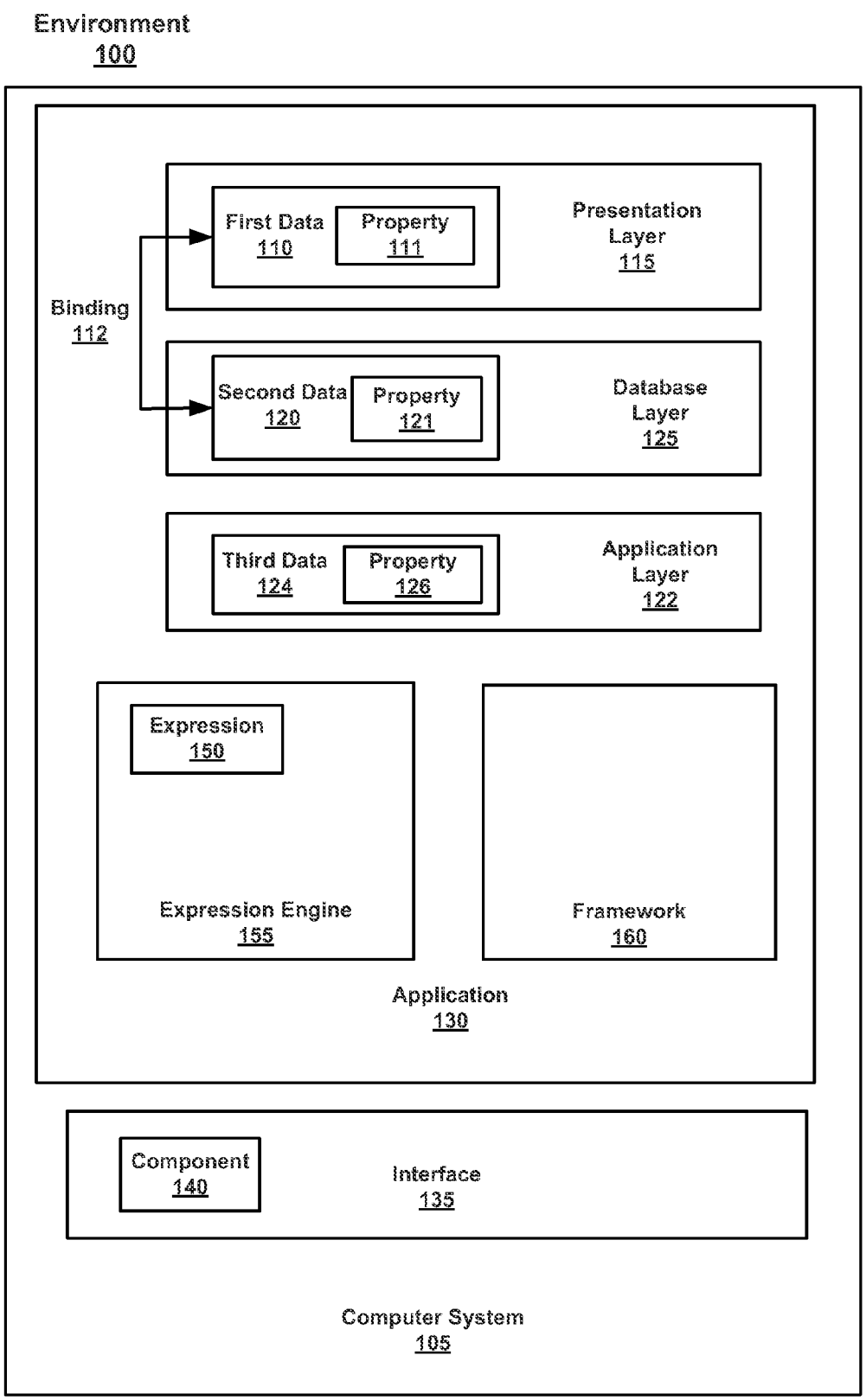
FIG. 1 is a block diagram of an environment for binding data in an application in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, user interface controls, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving," "creating," "moving," "modifying," "altering," "querying," or the like, refer to the actions and processes of a computer system, or similar electronic computing device. The computer system or similar electronic computing device, such as a smart phone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Dynamically Binding Data in an Application

Embodiments of the present technology are for binding data in an application. Software applications or software programs require the manipulation and movement of data, objects and other information. A software application may have more than one layer such as a presentation layer that the user experiences and the database layer that stores data that may or may not be accessed in the execution of the of the application. The presentation layer may comprise control objects while the database layer comprises source objects. There exists a need when developing and executing an application to bind a control object to a source object such that the source object may be moved from the database layer of the application to the presentation layer of the application as needed. The source object may or may not be modified and then moved back to the database layer. Such movement of data or objects may be referred to as data binding. A developer may be required to manually create such binding or rely on a compiler to create the bindings based on code. The present technology operates to create such bindings in an efficient and automated manner.

An expression engine may be employed at a computer system to create the bindings between objects. The bindings may be created automatically and dynamically during the execution of the application or may be created during the development of the application. The expression engine is able to receive an expression which relates or requires a relation between two objects. The expression may be a command from a developer or user of the application and may be written in a programming language or may be written in a more general expressive language or may be created in a user interface with inputs from a keyboard, mouse or the like. The expression engine then creates the binding by evaluating the required relation and the properties associated with the object that are of the type necessary for the required relation. For example, the object may comprise data related to customer name and the required relation necessitates the data of the customer name. The expression engine then creates a binding linking the control object, which performs the function required by the application, and the source object which comprises the data of the customer name. During execution of the application the source object may be modified. For example, the customer name may be changed in the source object; the source object may then be moved back to the database layer of the application with the modifications.

In one embodiment, the expression engine does not know the data type of a given object, therefore this knowledge must be discovered by the expression engine. The expression engine may employ run time type information (RTTI) to query the object to gain information regarding the object's data type and data types of its properties. Thus RTTI is a mechanism that may be employed by the expression engine or developer to query objects regarding their data and capabilities. This information may then be used to make dynamic bindings between objects.

RTTI is a way of introspection. For example, RTTI may be employed to discover the text property of a source object. To create a binding that will allow edit control of this text property, the expression engine must first discover the text control. RTTI is used to discover the text property of a control and its data type, such as a string, and then the expression engine binds a control object's text property that is able to read and edit the text property of the source object. A binding may bind a number to a string or any data type to another data type. Thus, the present technology operates to bind two string objects together through the text properties.

The present technology provides for many examples of binding data in an application. The following discussion will demonstrate various hardware, software, and firmware for binding data in an application in various embodiments of the present technology. Furthermore, the systems and methods may include some, all, or none of the hardware, software and firmware discussed below.

Dynamically Binding Data in an Application

Referring to the figures, exemplary embodiments of the technology will now be described. The following description will focus on embodiments of the present technology, which are systems and methods for binding data in an application. The present technology, however, is not limited to any one particular device, operating system, environment, or platform. Instead, those skilled in the art will find that the system and methods of the present technology may be advantageously embodied on a variety of different platforms. Therefore, the description of the exemplary embodiments that follows is for purposes of illustration and not limitation.

FIG. 1 is a block diagram illustrating environment 100 which is an example environment comprising computer system 105, first data 110, property 111, presentation layer 115, binding 112, second data 120, property 121, application layer 122, third data 124, property 126, database layer 125, application 130, interface 135, component 140, expression 150, expression engine 155, and framework 160. Environment 100 depicts computer system 105 as a hardware device for carrying out the present technology. Computer system 105 may be a general purpose computer system, an embedded computer system, a personal computer such as a desktop computer, a laptop, a notebook, an electronic handheld device, a personal digital assistant, a smart phone, a tablet computer, a net book, user devices, or the like. In one embodiment, computer system 105 comprises memory, storage and a processor such as a central processing unit that carry out the instructions of a computer program such as an operating system or portions of the present technology. Computer system 105 may also comprise a graphics processing unit (GPU) to process and render display features. In one embodiment, the present technology is part of LiveBindings software products developed by Embarcadero Technologies.

Application 130 is a software program, a software application, or app designed to execute or run on a hardware system such as computer system 105. In one embodiment, application 130 is in the processes of being designed by a developer on computer system 105. In one embodiment, application 130 is in the process of being executed on computer system 105 operating as an end user device. Application 130 comprises presentation layer 115 which is a layer, a portion or a part of application 130 designed for interaction with an end user. Presentation layer 115 comprises first data 110 which may be data, information, or an object associate with application 130. In one embodiment, first data 110 is a control object which is a component or part of application 130 designed to control data in application 130. Application 130 also comprises database layer 125 which is a layer, portion, or part of application 130 that is a database or storage location for data, information and objects such as second data 120. In one embodiment, second data 120 is a source object which comprises data and other functions or capabilities. For example, a source object may comprise text fields that house information such as names, customer names, credit card information, inventory, etc. A source object may also have functions such as the ability to be modified. Binding 112 depicts a binding or link between first data 110 and second data 120.

Application 130 may include framework 160. Framework 160 is for creating an expression or a plurality of expressions used to create bindings such as binding 112. For example, framework 160 is able to receive input from a developer or other user regarding the intent of the developer. The input may be received in the form of code, plain language, or other input. Framework 160 then generates or creates the expression based on the intent of the developer. Framework 160 is also capable of orchestrating or managing the movement of data and objects through the application and layers such as the movement of second data 120 through presentation layer 115 and database layer 125. This orchestration or management may include managing the creation of expressions, the creation of bindings, and changes or modifications to data or objects. Framework 160 may also have control over expression engine 155. In one embodiment, framework 160 is employed to decide when to execute an expression in application 130. For example, the intent of the user may require an expression to be executed only when a user of application 130 issues a command via the controls of application 130.

In one embodiment, application 130 comprises application layer 122 which may be described as an application logic layer and in general comprises data, information, and objects running, executing, or contained by application 130 such as third data 124. Presentation layer 115, database layer 125 and application layer 122 may be described as a software stack. It should be appreciated that first data 110, second data 120, and third data 124 may be contained by presentation layer 115, database layer 125 and application layer 122. The data may be bound to another data within the same layer or a different layer and a data may be moved between layers while maintaining a binding with another data. Binding 112 is depicted as linking first data 110 and second data 120. Binding 112 may link first data 110 to third data 124 or second data 120 to third data 124. In one embodiment, binding 112 may link a data to itself.

First data 110, second data 120, and third data 124 may each comprise property 111, property 121 and property 126 respectively. Property 111, property 121 and property 126 are properties or data properties of a component. A property has a data type associated with it. For example, a data may comprise information, the type of property of the data is text and the property is the actual text associated with the data. The present technology dynamically creates bindings between objects or data and may do so based on the property of the data. For example, binding 112 may bind property 111 and property 121 together such that if property 111 is changed, then the expression engine will change property 121 based on the change to property 111 wherein the change occurs because of binding 112. Thus first data 110 and second data 120 are bound together. A data or object may have more than one property and/or property type and a data or object may be linked to another object with more than binding associated with one or more properties of the object. An object may also be subject to multiple bindings with multiple objects. In one embodiment, a first property of an object is bound to a second property of the same object.

It should be appreciated that a property in the source could be different from the property in the control and vice versa. The binding may operate to bind a number to a string or any other data type. Such a binding may convert the data type as it moves through the layers of the application. For example, a data or object may be a calendar or data for a calendar. The calendar data may be stored as a number when it is in the database layer, but it needs to be converted to a string in the presentation layer. The binding operates such that the data type is converted appropriately as the data moves from one layer to another. Such conversions may be controlled by the expression engine or the framework.

In one embodiment, computer system 105 comprises expression engine 155. It should be appreciated that expression engine 155 may be a component or part of application 130 and may also be a component or part of an application used for designing application 130. Expression engine 155 is for receiving an expression such as expression 150. Expression 150 may be generated by a developer of application 130, a user of application 130, by application 130, or by expression engine 155. Expression 150 may define or require a relationship between two objects or two pieces of data. For example, expression 150 may describe that the name of a customer is to be entered into a data field of second data 120 as the name is received as data from a user in presentation layer 115. First data 110 may be a control object that can control or edit such data. Expression engine 155 then binds first data 110 to second data 120 such that first data 110 can control second data 120, a source object, to enter or modify the customer name in second data 120 as data is received from a user of application 130. The source object may have properties associated with it and the source object may be assigned a value according to a local variable in the control object. In one embodiment, expression engine 155 operates with a compiler to create the bindings. The expression engine 155 allows a developer to create application 130 with these described bindings without having to write code directed to each of the bindings as expression engine 155 allows for the process to be automated.

Expression 150 may be generated using a programming language such as C++ or Delphi or other well-known languages. Expression 150 may also be generated using more general or plain language expressions or may be generated in a user interface used to graphically design application 130. The present technology is based on relational expressions called binding expressions that can be either unidirectional or bidirectional. The present technology is also about control objects and source objects. By means of these binding expressions, any source object can be bound to itself, it becomes both source and control object, or to any other control object, simply by defining a binding expression involving one or more properties of the objects you want to bind together. For example, you can bind an edit control to a label so that, when the text changes in the edit box, the caption of the label is automatically adjusted to the value evaluated by your binding expression.

In the general execution of application 130, presentation layer 115 may use first data 110 to control second data 120 and move second data 120 from database layer 125 to presentation layer 115. At this point a user may enter data to modify or alter second data 120. After which second data 120 may be moved back to database layer 125. For this to be accomplished, first data 110 must first be linked or bound to second data 120 so that first data 110 knows where to find second data 120 and how to carry out operations regarding second data 120. Expression engine 155 solves this problem by creating binding 112 to bind first data 110 to second data 120. This may be accomplished by expression engine 155 evaluating first data 110 and second data 120 to understand their respective data types, functions and capabilities. In one embodiment, expression engine 155 has no prior knowledge of first data 110 and second data 120. Application 130 may not be able to provide such knowledge to expression engine 155, therefore expression engine 155 must discover this knowledge itself. In one embodiment, this knowledge is discovered using run time type information (RTTI).

In one embodiment, bindings may be employed to propagate a change to a plurality of objects or data that are connected via a chain of bindings. For example, first data 110 may be bound to second data 120 and second data 120 may be bound to a third data such that when a property of second data 120 is changed due to the binding, the change is propagated to the appropriate property of the third data through the binding between second data 120 and the third data. In one embodiment, expression engine 155 is employed to create and manage a plurality of bindings associated with a plurality of objects or data. Additionally, bindings may be grouped together in a binding list which is a collection of bindings created for application 130. The binding or binding lists may be presented to a developer graphically in interface 135 where the developer may view, change, remove, modify or alter the bindings and its parameters and properties.

A solution for binding data is to use a database editor such as DBEdit working with a TField. In such a solution, the DBEdit may be able to extract data out of the TField and send it back in the other direction. However, if another editor or control is desired in conjunction with DBEdit, then additional effort is required by the developer. The present technology does not require the use of DBEdit or other database editors such as TEdit and instead uses an intermediary set between the edit and the field to manage moving data between layers of application 130. The use of RTTI allows the expression engine 155 to create a binding and does not have to consider the type of database editor required to edit the source object. The RTTI allows the expression engine to simply have knowledge of the data type of the source object and then expression engine 155 creates the binding accordingly. For example, RTTI may be able to identify that the source object has text which is all the knowledge that expression engine 155 may be required to have in a given embodiment.

In one embodiment, computer system 105 comprises interface 135 and component 140. Interface 135 may be a graphical user interface employed by a developer to develop application 130 by clicking and dragging visual or graphical components into desired locations. Application 130 may be located within interface 135 during the development of application 130. Interface 135 may include libraries of predefined visual objects, buttons, text fields, etc. employed in the design of an application. Component 140 may be a visual component such as a button that is placed within application 130 by the developer. The graphical user interface may be part of a larger platform used to design or develop applications. For example, a component may be a button to be used in a menu associated with the application. The platform and interface may provide an application developer with a plurality of standard buttons to choose. The application developer makes a selection by clicking and dragging the desired button into position within the interface. The button, or other component, may also comprise a variety of properties such as color, animations, effects, style, text, font, text size, etc. In one embodiment, the interface 135 is part of Firemonkey software products developed by Embarcadero Technologies used for creating and executing applications.

Figure 2:
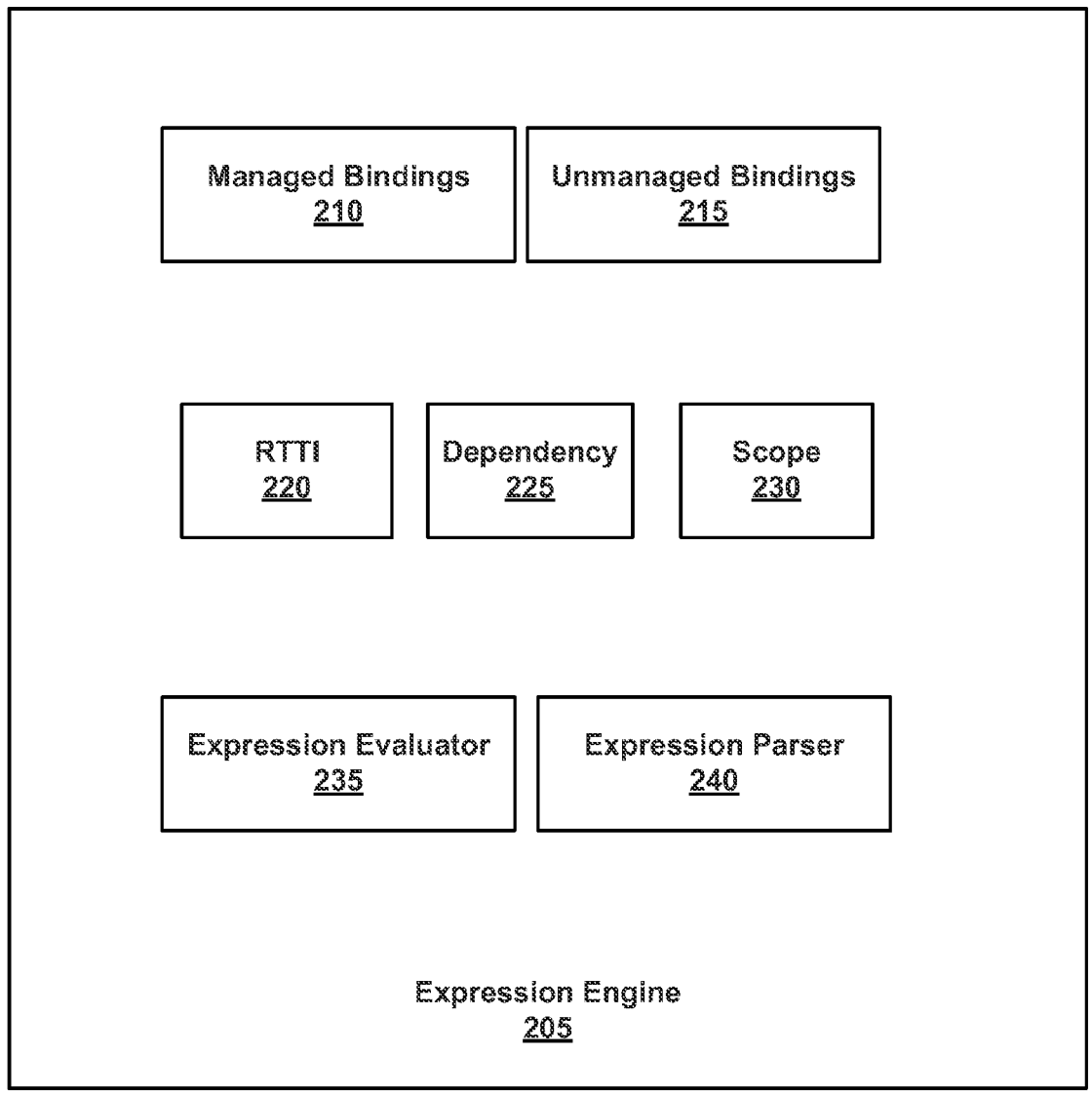
FIG. 2 is a block diagram of an environment for binding data in an application in accordance with embodiments of the present technology.

FIG. 2 is a block diagram illustrating environment 200 which is an example environment comprising expression engine 205, managed binding 210, unmanaged binding 215, RTTI 220, dependency 225, scope 230, expression evaluator 235, and expression parser 240. It should be appreciated that expression engine 205, in embodiments, has the same features, capabilities and functions of expression engine 155 of FIG. 1.

Expression engine 205 may comprise both managed binding 210 and unmanaged binding 215. In one embodiment, managed binding 210 is a managed binding in which expression engine 205 is employed to direct the data in a predetermined fashion by executing an expression. In one embodiment, managed binding 210 comprises multiple points of data that are all connected by an edit control and connected to a slider such that if a value is changed in the edit control, it changes or slides the value of all the data connected to the edit control. This may allow an expression to be reevaluated automatically. Unmanaged binding 215 is a binding that is not managed in a predetermined fashion and may be a collection of data. In one embodiment, two data points are connected to one another by a binding and if one is changed, the other is changed based on a dependency created by the binding.

RTTI 220 comprises run time type information that is available to a programming language and is employed by expression engine 205 in the same manner in which expression engine 155 of FIG. 1 employs RTTI. In one embodiment, RTTI 220 has more introspection than the basic native types that C programmers and C++ programmers use. The introspection that was added in the present technology comprises line type information for both the classes and methods to describe the layout of the classes and the basic method types. Thus, the present technology allows a developer to query the run-type information for the object, and know a lot more about it. RTTI 220 also allows a developer to invoke procedures so, if the developer wants to call a method on an object, the developer now has enough information to take the pointer to the object and point to the method and invoke the method with the appropriate parameters. RTTI 220 comprises detailed information about all the parameter types for the procedures and what those actual types are. Those types can be all kinds of different types and they can be pointing to other classes that have run time type information. RTTI 220 provides detailed segment information for all the structures in a simple pellet structure with 30 fields that are laid out for the types, for all the fields.

RTTI may be described as a programming paradigm in which information about a type can be obtained at run time with no prior knowledge of the type. If RTTI generation is enabled, the resulting binary includes special metadata that contains information about types (for example, class ancestry, declared fields, annotated attributes). Using the functionality provided in the RTTI unit, you can obtain this information at run time. The net result is the ability to create more abstract and generalized frameworks that can operate on any type that exposes RTTI. RTTI information is stored in the compiled binary, which means it does not need actual initialization. RTTI builds up a clean, object-oriented interface that can be easily used in any application. The RTTI unit provides a special record, called TRTTIContext which manages the lifetime of all objects created during an RTTI work session.

Dependency 225 may be a component of expression engine 205 and may comprise the ability to manage dependency for data or objects and how they are bound to one another. Thus if an object is dependent upon another object, if the other object is changed then dependency 225 changes the first object accordingly. In one embodiment, expression engine 205 comprises scope 230. Scope 230 allows the scope of an object to be defined by a developer. In one embodiment, the scope of the object and its binding may include two expressions. For example, the R value and the L value where the L value is value assigned to a binding and the R value produces a value and may use operators or methods. Expression evaluator 235, in one embodiment, is employed to evaluate an expression such as expression 150 of FIG. 1 to determine what operations must be carried out and what bindings must be formed to satisfy the expression. Expression parser 240 then operates to parse the expression.

Operations

Figure 3:
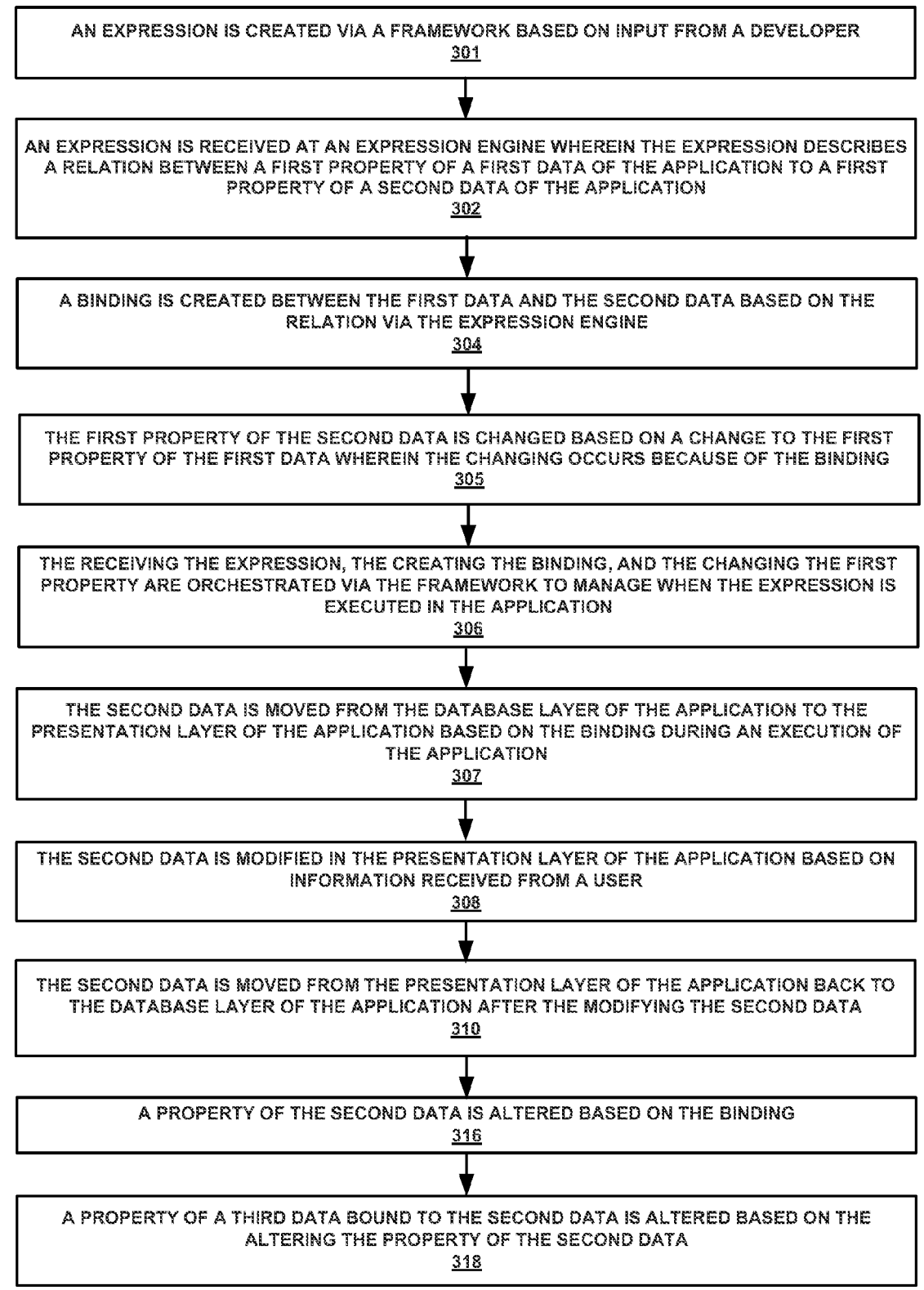
FIG. 3 illustrates a flowchart of an example method for binding data in an application, in accordance with embodiments of the present technology.

FIG. 3 is a flowchart illustrating process 300 for binding data in an application, in accordance with one embodiment of the present invention. In one embodiment, process 300 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 300 is performed by the devices and components in FIGS. 1 and 2.

At 301, an expression is created via a framework based on input from a developer. For example, framework 160 of FIG. 1 may be used.

At 302, the expression is received at an expression engine wherein the expression describes a relation between a first data associated with a presentation layer of the application to a second data associated with a database layer of the application. In one embodiment, the expression is expression 150, the first data is first data 110, the second data is second data 120, and the expression engine is expression engine 155 of FIG. 1. In one embodiment, the first and second data are objects in a software application such as control objects or source objects. 302 may occur during the development of the application or may occur during the execution of the application.

At 304, a binding is created between the first data and the second data based on the relation via the expression engine. In one embodiment, the binding is binding 112 of FIG. 1. The binding may be created via the expression engine employing RTTI to query the first and second data to discover knowledge such as the data types of the first and second data. 304 may occur during the development of the application or may occur during the execution of the application. It should be appreciated that the development of the application may occur via code written in a programming language and compiled into an application or may occur via a visual program for designing application in a graphical user interface. In one embodiment, the application is developed using C++ programming language. The binding may allow the first and/or second data to move in unidirectional or bidirectional manners. In one embodiment, 302 and 304 are repeated for a plurality of bindings created for a plurality of objects.

At 305, the first property of the second data is changed based on a change to the first property of the first data wherein the changing occurs because of the binding.

At 306, the receiving the expression, the creating the binding, and the changing the first property are orchestrated via the framework to manage when the expression is executed in the application.

At 307, the second data is moved from the database layer of the application to the presentation layer of the application based on the binding during an execution of the application.

At 308, the second data is modified in the presentation layer of the application based on information received from a user. For example, the second data may comprise a text field that is changed due to user input.

At 310, the second data is moved from the presentation layer of the application back to the database layer of the application after the modifying the second data. Thus the second data may be described as an object that may be moved in a bidirectional fashion due to its binding.

At 316, a property of the second data is altered based on the binding. For example, a text field of the second data may be altered.

At 318, a property of a third data bound to the second data is altered based on the altering the property of the second data. The third data may comprise a text field that correlates to the text field associated with the second data and thus the binding between the second and third data propagates the change to the third data.

Figure 4:
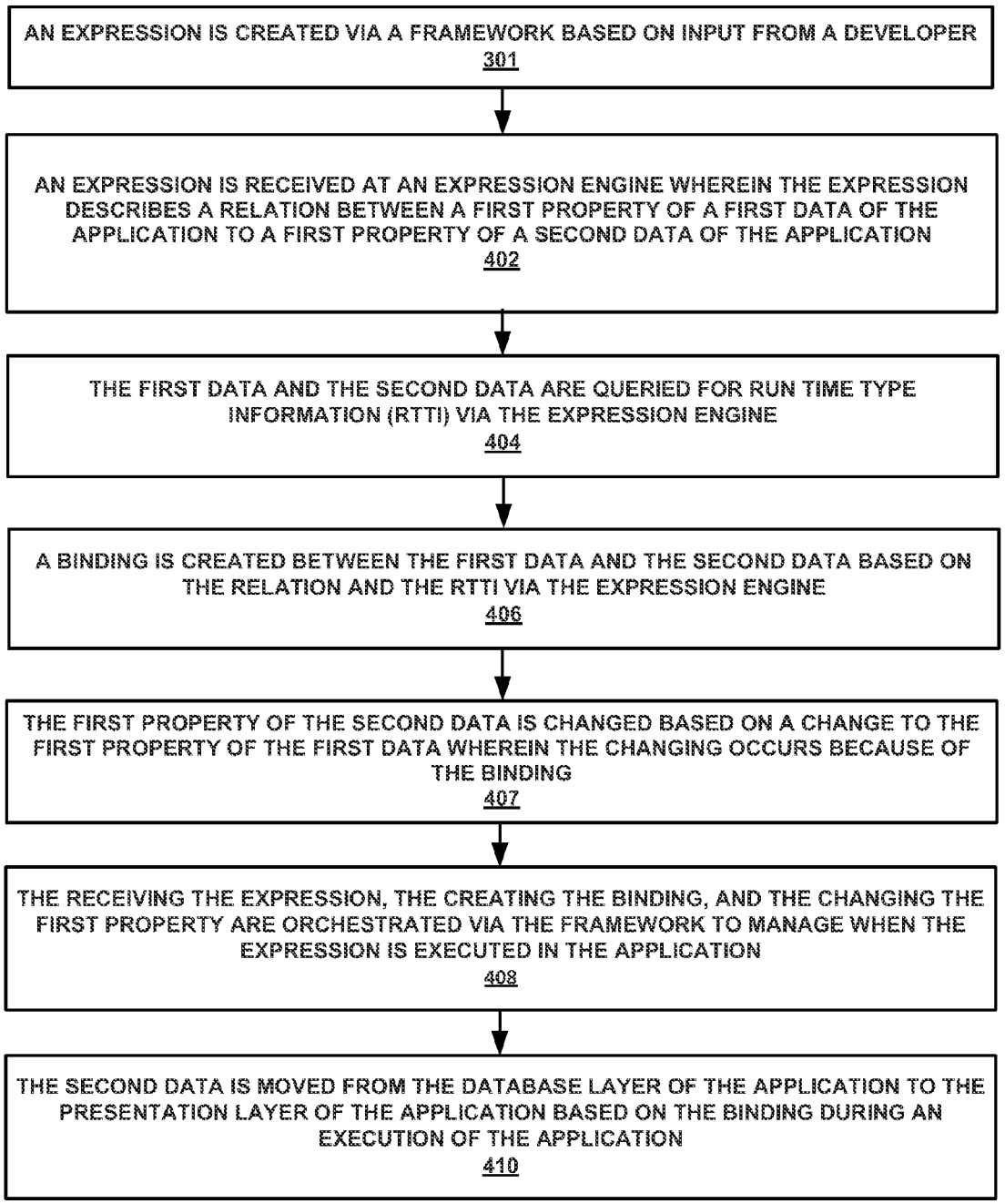
FIG. 4 illustrates a flowchart of an example method for binding data in an application, in accordance with embodiments of the present technology.

FIG. 4 is a flowchart illustrating process 400 for binding data in an application, in accordance with one embodiment of the present invention. In one embodiment, process 400 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 400 is performed by the devices and components in FIGS. 1 and 2. In one embodiment, the application is developed using C++ programming language.

At 401, an expression is created via a framework based on input from a developer. For example, framework 160 of FIG. 1 may be used.

At 402, an expression is received at an expression engine wherein the expression describes a relation between a first data associated with a presentation layer of the application to a second data associated with a database layer of the application.

At 404, the first data and the second data are queried for run time type information (RTTI) via the expression engine.

At 406, a binding is created between the first data and the second data based on the relation and the RTTI via the expression engine.

At 407, the first property of the second data is changed based on a change to the first property of the first data wherein the changing occurs because of the binding.

At 408, the receiving the expression, the creating the binding, and the changing the first property are orchestrated via the framework to manage when the expression is executed in the application.

At 410, the second data is moved from the database layer of the application to the presentation layer of the application based on the binding during an execution of the application.

While the technology is described in some detail with specific reference to embodiments and alternatives, there is no intent to limit the technology to a particular embodiment or specific alternatives. For instance, those skilled in the art will appreciate that modifications may be made to embodiments without departing from the teachings of the present technology.

Example Computer System Environment

The present technology may be carried out, associated with or otherwise practiced with a computer system. Portions of the present technology are composed of computer-readable and computer-executable instructions that reside, for example, in computer-usable media of a computer system or other user device such as computer system 105 of FIG. 1. Described below is an example computer system or components that may be used for or in conjunction with aspects of the present technology such for binding data in an application.

It is appreciated that that the present technology can operate on or within a number of different computer systems including general purpose networked computer systems, embedded computer systems, a personal computer such as a desktop computer, a laptop, a notebook, an electronic handheld device, a personal digital assistant, a smart phone, a tablet computer, a net book, user devices, and the like. The computer system is well adapted to having peripheral computer readable media such as, for example, a floppy disk, a compact disc, flash memory and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smart phone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer readable medium having instructions embodied therein that when executed cause a computer system to perform a method for dynamically binding data in an application, said method comprising:
    creating an expression via a framework based on input from a developer;
    receiving said expression at an expression engine wherein said expression describes a relation between a first property of a first data of said application to a first property of a second data of said application, wherein said first data is associated with a presentation layer of said application and wherein said second data is associated with a database layer of said application;
    creating a binding between said first data and said second data based on said relation via said expression engine;
    changing said first property of said second data based on a change to said first property of said first data wherein said changing occurs because of said binding;
    orchestrating said receiving said expression, said creating said binding, and said changing said first property via said framework to manage when said expression is executed in said application;
    moving said second data from said database layer of said application to said presentation layer of said application based on said binding during an execution of said application;
    modifying said second data in said presentation layer of said application based on information received from a user; and
    moving said second data from said presentation layer of said application back to said database layer of said application after said modifying said second data.

2. The non-transitory computer readable medium of claim 1 wherein said receiving said expression and said creating said binding are accomplished using run time type information (RTTI) associated with said first data and said second data.

3. The non-transitory computer readable medium of claim 1 wherein said receiving said expression and said creating said binding occur during development of said application.

4. The non-transitory computer readable medium of claim 3 wherein said development of said application occurs via a manipulation of visual components associated with a graphical user interface.

5. The non-transitory computer readable medium of claim 1 wherein said receiving said expression and said creating said binding occur dynamically during an execution of said application.

6. The non-transitory computer readable medium of claim 1 wherein said binding occurs to allow said first data or said second data to move unidirectional.

7. The non-transitory computer readable medium of claim 1 wherein said binding occurs to allow said first data or said second data to move bidirectional.

8. The non-transitory computer readable medium of claim 1 wherein said first data is a control object of said application and said second data is a source object of said application.

9. The non-transitory computer readable medium of claim 1 wherein said changing said first property of said second data converts a data type of said second data to a new data type.

10. The non-transitory computer readable medium of claim 1 wherein said receiving said expression, said creating said binding and said moving said second data are repeated to create a plurality of bindings based on a plurality of expressions.

11. The non-transitory computer readable medium of claim 1, further comprising:
    altering a property of said second data based on said binding; and
    altering a property of a third data bound to said second data based on said altering said property of said second data.

12. The non-transitory computer readable medium of claim 1 wherein said application was developed using C++ programming language.

13. The non-transitory computer readable medium of claim 1 wherein said creating said expression creates a plurality of expressions and said creating said binding creates a plurality of bindings based on said plurality of said expressions.

14. A non-transitory computer readable medium having computer readable program code embedded therein that when executed causes a computing system to dynamically bind data in an application, said program code comprising:
    a first data with a first property, wherein said first data is associated with a presentation layer of said application;
    a second data with a first property, wherein said second data is associated with a database layer of said application;
    an expression relating said first data to said second data; and
    an expression engine for querying said first data and said second data for run time type information (RTTI), receiving said expression, binding said first data to said second data based on said RTTI and said expression and for changing said first property of said second data based on a change to said first property of said first data wherein said changing occurs because of said binding, wherein said expression engine is for moving said second data from said database layer of said application to said presentation layer of said application based on said binding during an execution of said application; and
    a framework for creating said expression based on input from a developer and for orchestrating a movement of said first data and said second data in said application to control when said expression is executed in said application.

15. The non-transitory computer readable medium of claim 14 wherein said application was developed using C++ programming language.

16. The non-transitory computer readable medium of claim 14, further comprising:
    a graphical user interface at said computing system for manipulating said expression and properties of said first data and said second data.

17. The non-transitory computer readable medium of claim 14 wherein said binding is a managed binding.

18. The non-transitory computer readable medium of claim 14 wherein said binding is an unmanaged binding.

19. A non-transitory computer readable medium having instructions embodied therein that when executed cause a computer system to perform a method for dynamically binding data in an application, said method comprising:

creating an expression via a framework based on input from a developer;

receiving said expression at an expression engine wherein said expression describes a relation between a first property of a first data of said application to a first property of a second data of said application, wherein said first data is associated with a presentation layer of said application and wherein said second data is associated with a database layer of said application;

querying said first data and said second data for run time type information (RTTI) via said expression engine;

creating a binding between said first data and said second data based on said relation and said RTTI via said expression engine;

changing said first property of said second data based on a change to said first property of said first data wherein said changing occurs because of said binding;

orchestrating the receiving the expression, the creating the binding, and the changing the first property via the framework to manage when the expression is executed in the application; and moving said second data from said database layer of said application to said presentation layer of said application based on said binding during an execution of said application.

* * * * *